United States Patent
Inoue

(10) Patent No.: US 11,792,375 B2
(45) Date of Patent: Oct. 17, 2023

(54) LENS APPARATUS, IMAGE PROCESSING APPARATUS, IMAGE PICKUP APPARATUS, CONTROL METHOD FOR LENS APPARATUS, IMAGE PROCESSING METHOD, AND MEMORY MEDIUM

(71) Applicant: CANON KABUSHIKI KAISHA, Tokyo (JP)

(72) Inventor: Hajime Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 17/517,812

(22) Filed: Nov. 3, 2021

(65) Prior Publication Data
US 2022/0159225 A1    May 19, 2022

(30) Foreign Application Priority Data

Nov. 13, 2020 (JP) ................................ 2020-189160

(51) Int. Cl.
| | |
|---|---|
| H04N 9/64 | (2023.01) |
| G03B 17/14 | (2021.01) |
| H04N 23/55 | (2023.01) |
| H04N 23/88 | (2023.01) |
| H04N 23/663 | (2023.01) |

(52) U.S. Cl.
CPC ............ *H04N 9/643* (2013.01); *G03B 17/14* (2013.01); *H04N 23/55* (2023.01); *H04N 23/663* (2023.01); *H04N 23/88* (2023.01); *G03B 2206/00* (2013.01)

(58) Field of Classification Search
CPC ...... H04N 9/643; H04N 23/55; H04N 23/663; H04N 23/88; G03B 17/14; G03B 2206/00
See application file for complete search history.

(56) References Cited

U.S. PATENT DOCUMENTS

| | | | |
|---|---|---|---|
| 9,300,935 B2 | 3/2016 | Kano | |
| 2014/0022411 A1* | 1/2014 | Kano | ..................... H04N 23/66 348/224.1 |
| 2016/0182874 A1* | 6/2016 | Richards | ................ H04N 23/90 348/187 |

FOREIGN PATENT DOCUMENTS

JP            6041561 B2        12/2016

* cited by examiner

*Primary Examiner* — Christopher K Peterson
(74) *Attorney, Agent, or Firm* — ROSSI, KIMMS & McDOWELL LLP

(57) ABSTRACT

A lens apparatus is detachably attachable to an image pickup apparatus. The lens apparatus includes a notification unit configured to notify the image pickup apparatus of a type of the lens apparatus, and at least one processor or circuit configured to execute a plurality of tasks including a communication task configured to communicate with the image pickup apparatus. Via communication with the image pickup apparatus, the communication task transmits setting information for setting a white detection area to a white detection area different from a white detection area that corresponds to the type of the lens apparatus and is stored in the image pickup apparatus.

10 Claims, 17 Drawing Sheets

| LENS TYPE | TYPE TERM-INAL | ID FOR SELECTING WHITE BALANCE WHEN LENS OF LENS TYPE 1 IS USED | WHITE BALANCE SELECTED BY CAMERA |
|---|---|---|---|
| 2 | 2 | 0 (INVALID) | LENS TYPE 2 |
| 1 | 1 | 0 | LENS TYPE 1 |
| 1 | 1 | 1 | LENS TYPE 2 |
| 1 | 1 | 2 | LENS TYPE 3 |

| | |
|---|---|
| LENS TYPE 1 WHITE BALANCE COEFFICIENTS FOR SUNLIGHT | ⎫ |
| LENS TYPE 1 WHITE BALANCE COEFFICIENTS FOR SHADE | ⎬ AREA FOR |
| LENS TYPE 1 WHITE BALANCE COEFFICIENTS FOR CLOUDINESS | LENS TYPE 1 |
| . | |
| . | |
| . | ⎭ |
| LENS TYPE 2 WHITE BALANCE COEFFICIENTS FOR SUNLIGHT | ⎫ |
| LENS TYPE 2 WHITE BALANCE COEFFICIENTS FOR SHADE | ⎬ AREA FOR |
| LENS TYPE 2 WHITE BALANCE COEFFICIENTS FOR CLOUDINESS | LENS TYPE 2 |
| . | |
| . | |
| . | ⎭ |

UNIT SOLID

TYPE 0

TYPE 1

TYPE 2

TYPE 3

TYPE 4

TYPE 5

| (R000, G000, B000) |
| (R001, G001, B001) |
| (R002, G002, B002) |
| ⋮ |
| (R007, G007, B007) |
| (R010, G010, B010) |
| ⋮ |
| ⋮ |
| (R777, G777, B777) |

} 3D-LUT FOR LENS TYPE 1

| (R000, G000, B000) |
| (R001, G001, B001) |
| (R002, G002, B002) |
| ⋮ |
| (R007, G007, B007) |
| (R010, G010, B010) |
| ⋮ |
| ⋮ |
| (R777, G777, B777) |

} 3D-LUT FOR LENS TYPE 2

FIG. 13

LENS APPARATUS, IMAGE PROCESSING APPARATUS, IMAGE PICKUP APPARATUS, CONTROL METHOD FOR LENS APPARATUS, IMAGE PROCESSING METHOD, AND MEMORY MEDIUM

BACKGROUND OF THE INVENTION

Field of the Invention

The present invention relates to an image processing apparatus that reduces difference in hue of pickup images caused by an optical characteristic of an interchangeable lens.

Description of the Related Art

Conventionally, it has been known that hues of pickup images differ depending on types of interchangeable lenses attached to camera main bodies due to difference in color characteristics of the interchangeable lenses. Japanese Patent No. ("JP") 6041561 discloses an image processing apparatus that reduces difference in hue by changing a calculation method of a white balance adjustment value depending on a type of an interchangeable lens.

When the image processing apparatus disclosed in JP 6041561 detects that an attached interchangeable lens is an interchangeable lens of the same type, the same calculation method is executed. However, even when the interchangeable lenses are detected to be the same type, color characteristics of the interchangeable lenses may be different and may affect hues of images.

SUMMARY OF THE INVENTION

The present disclosure provides a lens apparatus, an image processing apparatus, an image pickup apparatus, a control method for a lens apparatus, an image processing method, and a memory medium each of which can reduce effects of lens apparatuses on hues of images even when the lens apparatuses attached to the image pickup apparatus are the same type.

A lens apparatus according to one aspect of the embodiments is detachably attachable to an image pickup apparatus. The lens apparatus includes a notification unit configured to notify the image pickup apparatus of a type of the lens apparatus, and at least one processor or circuit configured to execute a plurality of tasks including a communication task configured to communicate with the image pickup apparatus. Via communication with the image pickup apparatus, the communication task transmits setting information for setting a white detection area to a white detection area different from a white detection area that corresponds to the type of the lens apparatus and is stored in the image pickup apparatus.

An image processing apparatus according to one aspect of the embodiments includes at least one processor or circuit configured to execute a plurality of tasks of a determination task configured to determine a type of a lens apparatus, which was used for capturing an image, among a plurality of types of lens apparatuses having respective color characteristics different from each other, an image processing task configured to apply white balance adjustment to the image, and a communication task configured to communicate with the lens apparatus. When via communication with the lens apparatus, the communication task receives setting information for setting a white detection area to a white detection area different from a white detection area that corresponds to the type of the lens apparatus, the image processing task sets the white detection area based on the setting information, and applies the white balance adjustment.

An image pickup apparatus according to one aspect of the embodiments is an image pickup apparatus to which a lens apparatus is detachably attachable. The image pickup apparatus includes an image sensor and the above image processing apparatus.

A control method for the above lens apparatus, an image processing method corresponding to the above image processing apparatus, and storage mediums respectively storing computer programs that enables computers to execute the above methods also constitute other aspects of the present disclosure.

Further features of the present invention will become apparent from the following description of exemplary embodiments with reference to the attached drawings.

BRIEF DESCRIPTION OF THE DRAWINGS

FIG. 13 is a diagram illustrating an example of a 3D-LUT data structure corresponding to the lens type according to the embodiment.

DESCRIPTION OF THE EMBODIMENTS

Referring now to the accompanying drawings, a detailed description will be given of embodiments according to the present disclosure.

An image pickup apparatus such as a digital camera generates a pickup image by performing image processing such as white balance adjustment and color processing on a RAW image acquired by an image sensor such as a CMOS sensor. In general, the white balance adjustment is processing for adjusting levels of respective signal values of R, G, and B acquired from the image sensor, and the color processing is adjustment on color shades and a hue, color conversion processing using a 3D-LUT (three-dimensional lookup table), or the like. White balance adjustment and color processing are processing for properly expressing a hue of an object without causing a color cast or deterioration in color reproduction in the pickup image, the color cast and the deterioration being caused by an effect of spectral characteristics of a light source or the image sensor. The hue of the pickup image changes depending on a spectral transmittance of a lens. Especially in a lens-interchangeable digital single-lens reflex camera, there are a plurality of interchangeable lenses which are detachably attachable to a camera main body, and the spectral transmittance may be different depending on a type of an interchangeable lens.

Figure 2:
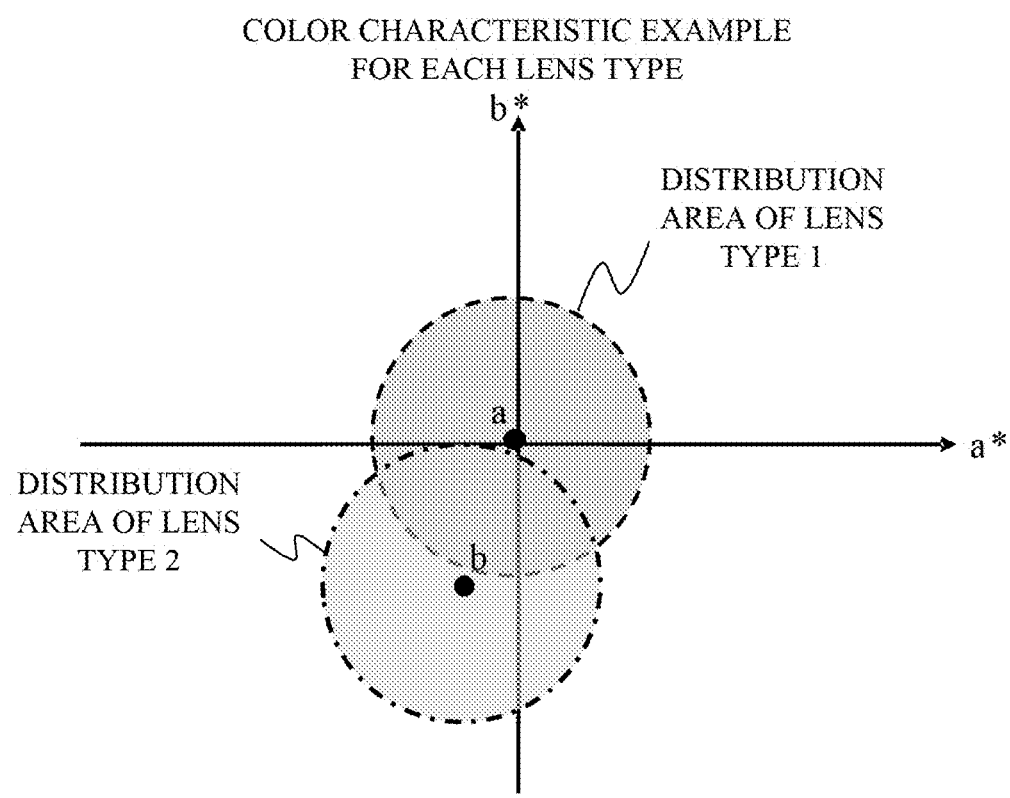
FIG. 2 is a diagram illustrating an example of a color characteristic of an interchangeable lens according to the embodiment.

Here, a description will be given of a color characteristic of an interchangeable lens with reference to FIG. 2. FIG. 2 is a diagram illustrating an example of color characteristics of interchangeable lenses. FIG. 2 indicates the color characteristics of the lenses calculated by using a spectral distribution of a certain light source and spectral transmittances of the lenses under the light source. In FIG. 2, the lens of a lens type 1 (first type) is an interchangeable lens (first lens apparatus) detachably attachable to a mirrorless camera, and the lens of a lens type 2 (second type) is an interchangeable lens (second lens apparatus) detachably attachable to a single-lens reflex camera. Interchangeable lenses classified into the lens type 1 include various types of lenses, and respective color characteristics of the lenses are distributed in a distribution area centered on a point a in the drawing. As in the lens type 1, interchangeable lenses classified into the lens type 2 include various types of lenses, and respective color characteristics of the lenses are distributed in a distribution area centered on a point b in the drawing.

There are various interchangeable lenses having various color characteristics, and therefore a digital camera, or a camera main body, is conceivable to which all of these interchangeable lenses are detachably attachable and which can perform image pickup with any of the interchangeable lenses. Even when mount shapes are different between the lenses of the lens type 1 and the lens type 2, or types of interchangeable lenses are different, by using an adapter having a structure that allows using a different mount shape, various interchangeable lenses are detachably attachable. In such a camera main body, when attached interchangeable lenses have different color characteristics, hues of images are different depending on the used interchangeable lens, and thus it is necessary to reduce the difference in hues of different images, the hue being different depending on the interchangeable lenses.

Even when the mount shapes are the same, that is, the interchangeable lenses are the same type (for example, the lens type 1), if the camera main body selects white balance for the lens type 1, it may be difficult to reduce size and cost of the camera main body. Therefore, the camera main body are configured so that the camera main body can select white balance for the lens type 2 when the lens is the lens type 1.

Figure 1:
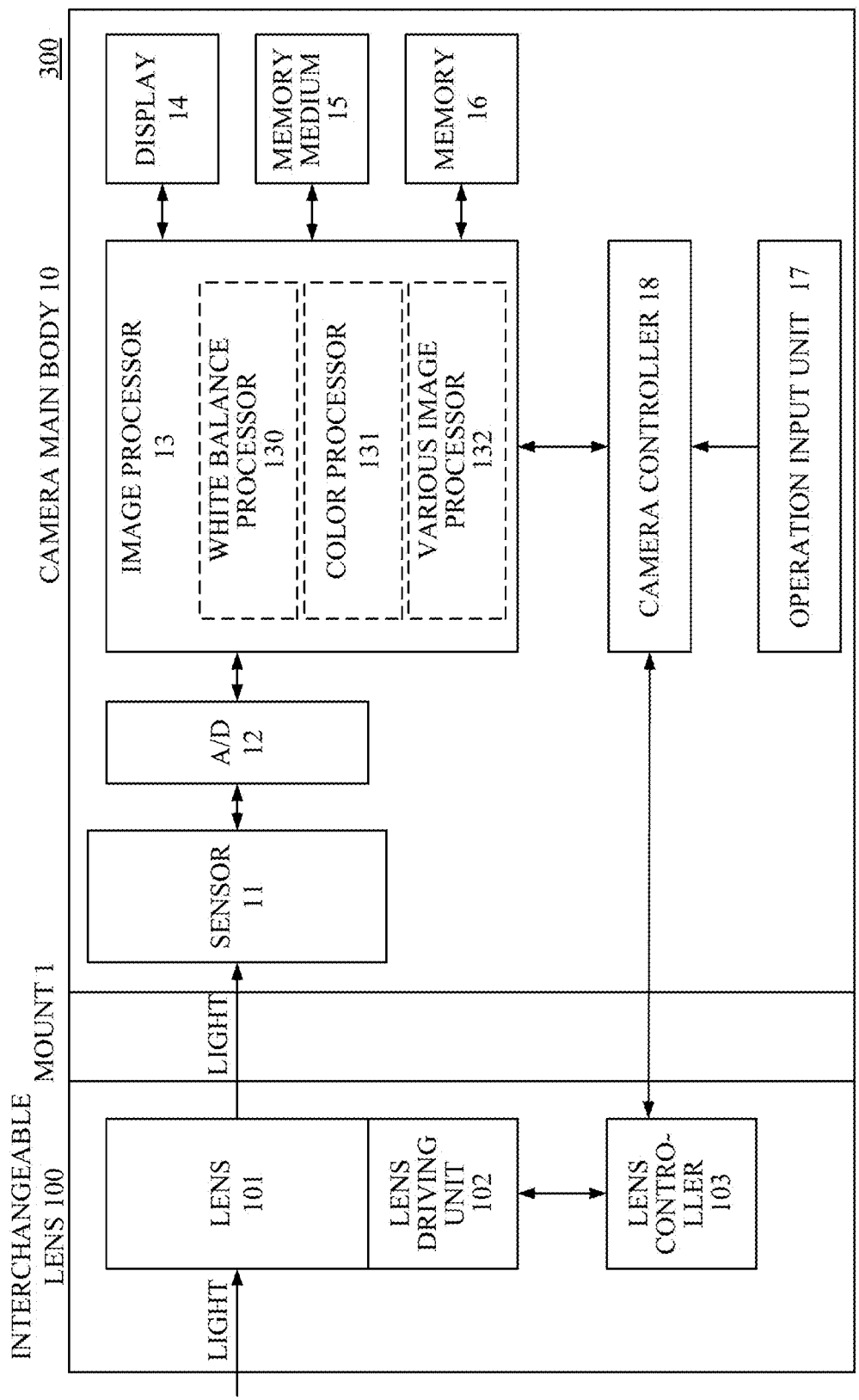
FIG. 1 is a block diagram illustrating a camera system according to an embodiment.

First, a description will be given of a camera system 300 which is an image pickup system in this embodiment with reference to FIG. 1. FIG. 1 is a block diagram illustrating the camera system 300. The camera system 300 includes a camera main body 10 as an image pickup apparatus and an interchangeable lens 100 as a lens apparatus detachably attachable to the camera main body 10. Each of the camera main body 10 and the interchangeable lens 100 includes a mount 1 having electrical contacts for powering the interchangeable lens 100 from the camera main body 10 or for communicating with each other.

The camera main body 10 includes an image sensor 11 such as a CMOS sensor or a CCD sensor. The image sensor 11 is configured to photoelectrically convert an optical image which is an object image formed by a lens 101 as an image pickup optical system in the interchangeable lens 100, and to output an electric signal. The camera main body 10 further includes an A/D converter 12 configured to convert the analog electric signal output from the image sensor 11 into a digital signal, and an image processor 13 configured to perform various image processing on the digital signal output from the A/D converter 12, and to generate an image.

The image processor 13 functions as an image processing unit configured to apply white balance adjustment to a pickup image, and includes a white balance processor 130, a color processor 131, and various image processor 132. The white balance processor 130 is configured to perform processing for adjusting a color ratio between R, G, and B by multiplying, by respective gains, red (R), green (G), and blue (B) signals included in the image input to the image processor 13. The color processor 131 is configured to perform color conversion processing, such as adjustment on color shades and color tone, and processing using a 3D-LUT. The various image processor 132 is configured to perform development processing such as pixel interpolation processing, brightness adjustment processing, and gamma processing. The image generated by the image processor 13 is displayed on a display 14 and stored in a memory medium 15.

The camera main body 10 includes a memory 16. The memory 16 functions as a buffer during processing on an image, and is configured to store an operation program used by a camera controller 18, which will be described later. The memory 16 stores various data described later used by the white balance processor 130 and the color processor 131. The camera main body 10 includes an operation input unit 17 including a power switch for powering on/off, an image pickup switch for starting image recording, a selection/setting switch for setting various menus, and the like. The camera controller 18 includes a microcomputer and is configured to control the image processor 13 and to control communication with the interchangeable lens 100 in response to a signal from the operation input unit 17.

On the other hand, the interchangeable lens 100 includes the lens 101, a lens driving unit 102, and a lens controller 103. The lens driving unit 102 is configured to drive an actuator for moving or operating a focus lens, a zoom lens, a diaphragm, an image stabilization lens, and the like (not illustrated) included in the lens 101. The lens controller 103 includes a microcomputer and is configured to control the lens driving unit 102 in response to a control signal received via communication with the camera controller 18. In this embodiment, a description will be given while it is assumed that there are two types of interchangeable lenses as the interchangeable lens 100 detachably attachable to the camera main body 10, but the present disclosure is not limited to this, and tree types or more of interchangeable lenses may be supported.

Figure 3:
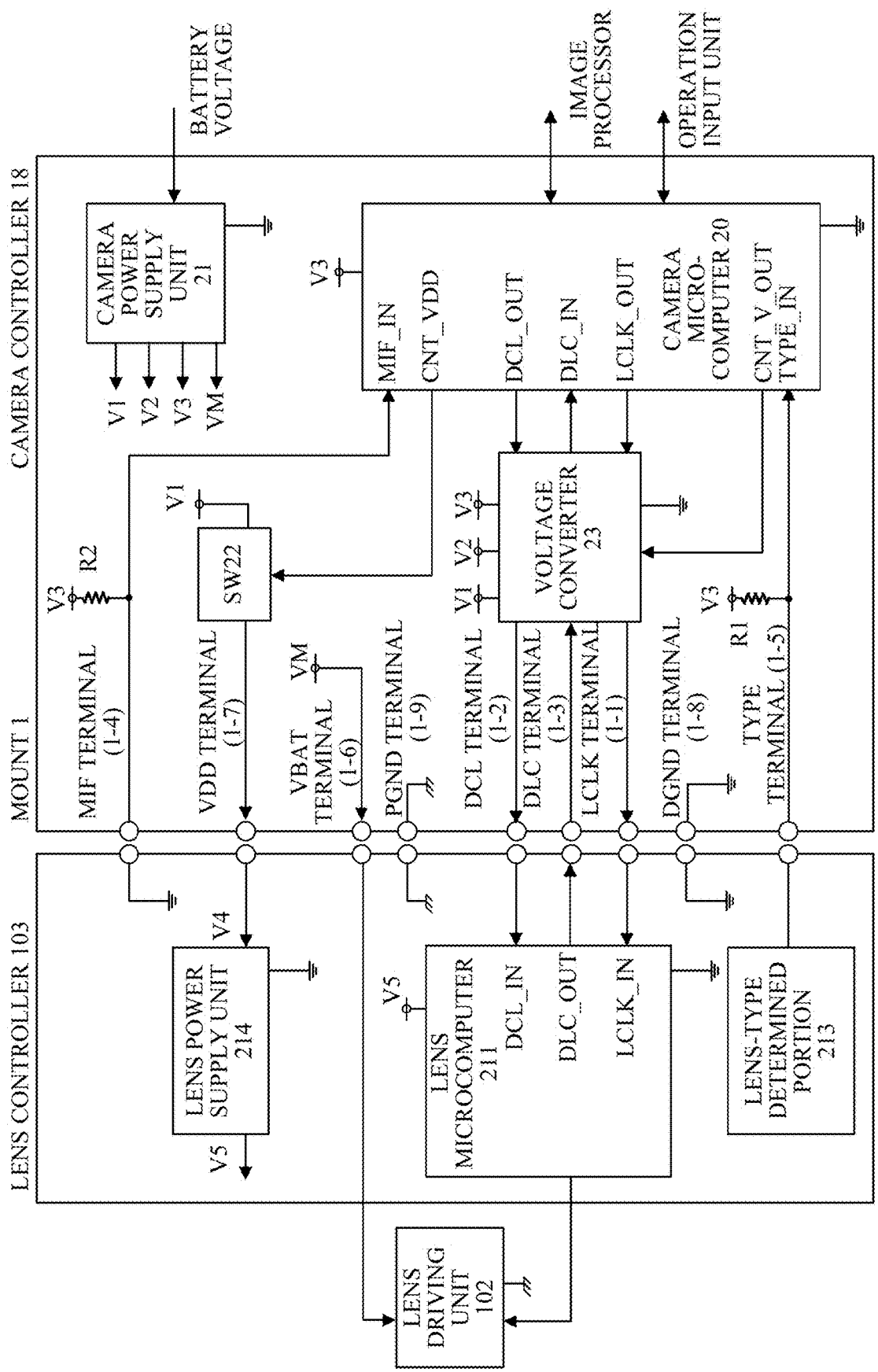
FIG. 3 is a block diagram illustrating a camera controller and a lens controller according to the embodiment.

Next, a description will be given of configurations of the camera controller 18 and the lens controller 103 which are electrically connected via the mount 1 with reference to FIG. 3. FIG. 3 is a block diagram illustrating the camera controller 18 and the lens controller 103.

An LCLK terminal (1-1) is a terminal for a communication clock signal output from the camera main body 10 to the interchangeable lens 100. A DLC terminal (1-2) is a terminal for communication data output from the camera main body 10 to the interchangeable lens 100. A DLC terminal (1-3) is a terminal for communication data output from the interchangeable lens 100 to the camera main body 10. An MIF terminal (1-4) is a terminal for detecting that the interchangeable lens 100 is attached to the camera main body 10. A camera microcomputer 20, which is a microcomputer in the camera controller 18, detects that the interchangeable lens 100 is attached to the camera main body 10 based on voltage at the MIF terminal.

A TYPE terminal (1-5) is a terminal for detecting the type of the interchangeable lens 100 attached to the camera main body 10. In this embodiment, the TYPE terminal (1-5) and a lens-type determined portion 213, which is a resistor RL, function as a notification unit for notifying the camera main body 10 of the type of the interchangeable lens 100. The TYPE terminal (1-5) is configured to output voltage corresponding to the resistor RL to the camera main body 10. The camera microcomputer 20 is configured to detect the type of the interchangeable lens 100 attached to the camera main body 10 based on the voltage of the TYPE terminal (1-5). A VBAT terminal (1-6) is a terminal for supplying driving power (VM) used for various operations except for control on communication from the camera main body 10 to the interchangeable lens 100. A VDD terminal (1-7) is a terminal for supplying communication control power (VDD) used for controlling communication, the power being supplied from the camera main body 10 to the interchangeable lens 100. A DGND terminal (1-8) is a terminal for connecting communication control systems of the camera main body 10 and the interchangeable lens 100 to the ground. A PGND terminal (1-9) is a terminal for connecting a mechanical driving system including motors and the like provided on the camera main body 10 and the interchangeable lens 100 to the ground.

A plurality of types of interchangeable lenses 100 having different communication voltages during communication with the camera main body 10 are selectively attached to the camera main body 10 in this embodiment. Hereinafter a description will be given of a case where the types of interchangeable lens 100 identified by the camera main body 10 based on the voltage at the TYPE terminal is the first lens apparatus of the lens type 1 or the second lens apparatus of the lens type 2 whose communication voltage is different from a communication voltage of the first lens apparatus.

A camera power supply unit 21 included in the camera controller 18 is configured to convert a battery voltage supplied from a battery (not illustrated) provided on the camera main body 10 into a voltage required for an operation of each circuit. At this time, the camera power supply unit 21 generates voltages V1, V2, V3, and VM. The first voltage V1 is a power voltage as a power (VDD) for controlling communication with the first and second lens apparatuses, and is a communication voltage of the first lens apparatus. The second voltage V2 is a communication voltage of the second lens apparatus. The third voltage V3 is a power voltage as power for operating the camera microcomputer 20. The VM is a power voltage as power for driving the first and second lens apparatus. When the power is turned on via the power switch 22, the camera microcomputer 20 starts supplying VDD and VM from the camera main body 10 to the interchangeable lens 100. When the power is turned off via the power switch 22, the camera microcomputer 20 stops supplying VDD and VM from the camera main body 10 to the interchangeable lens 100.

The camera microcomputer 20 communicates with the interchangeable lens 100 via a voltage converter 23. The camera microcomputer 20 includes an LCLK_OUT terminal for outputting a communication clock signal, a DCL_OUT terminal for outputting communication data to the interchangeable lens 100, and a DLC_IN terminal for receiving communication data input from the interchangeable lens 100. The communication clock signal and communication data correspond to communication signals. The camera microcomputer 20 functions as a communication unit, which is a camera communication unit, for communicating with the interchangeable lens 100.

The camera microcomputer 20 includes an MIF_IN terminal for detecting attachment of the interchangeable lens 100, a TYPE_IN terminal for identifying the type of the interchangeable lens 100, and a CNT_V_OUT terminal for outputting a communication voltage changing signal to the voltage converter 23. The camera microcomputer 20 functions as a determination unit for determining the type of the interchangeable lens, which was used for acquiring a pickup image, among the plurality of types of interchangeable lenses having different color characteristics. The camera microcomputer 20 includes a CNT_VDD_OUT terminal for outputting an energization signal from the power switch 22, a connection terminal to the image processor 13, and a connection terminal to the operation input unit 17.

A lens microcomputer 211, which is a microcomputer in the lens controller 103, is configured to communicate with the camera microcomputer 20 via the voltage converter 23. The lens microcomputer 211 includes an LCLK_IN terminal for inputting a communication clock signal, a DLC_OUT terminal for outputting communication data to the camera main body 10, a DCL_IN terminal for receiving communication data input from the camera main body 10, and a connection terminal to a lens driving unit 102. The lens microcomputer 211 functions as a communication unit, which is a lens communication unit, for communicating with the camera main body 10. The lens controller 103 includes a lens power supply unit 214 as a voltage generator.

Next, a description will be given of detection of attachment of the interchangeable lens 100 to the camera main body 10. The MIF_IN terminal in the camera microcomputer 20 is pulled up to the power supply by a resistor R2 (100 KΩ), and hence its voltage value is H (High) when the lens is not attached. On the other hand, when the interchangeable lens 100, which is the first or second lens apparatus, is attached, the MIF_IN terminal is connected to the GND in the interchangeable lens 100 and hence the voltage value is changed to L (Low) at the time when the interchangeable lens 100 is attached regardless of the type of the interchangeable lens 100.

Figure 4A:
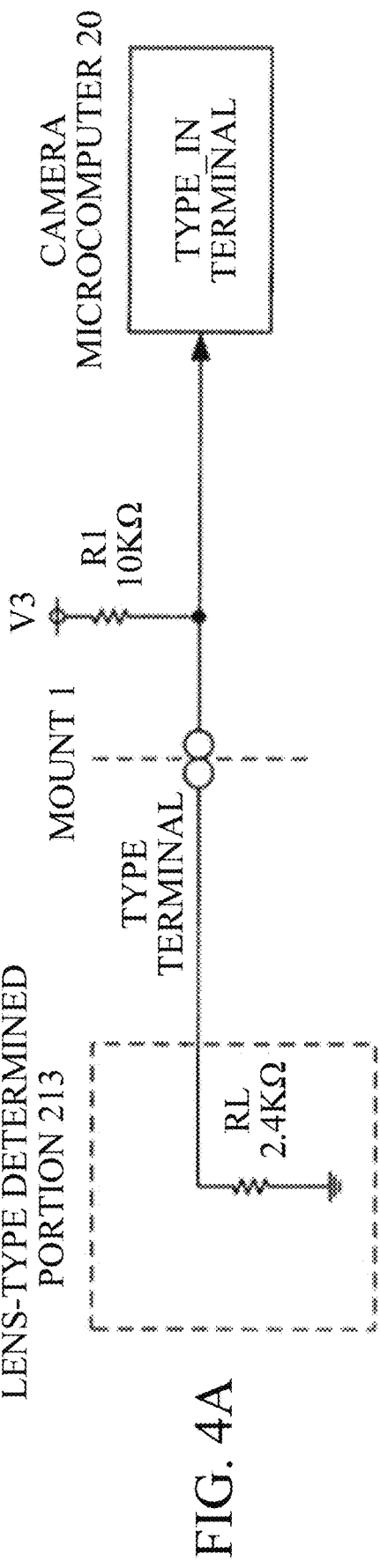
FIGS. 4A and 4B are explanatory diagrams illustrating a lens-type determined portion according to the embodiment.
Figure 4B:
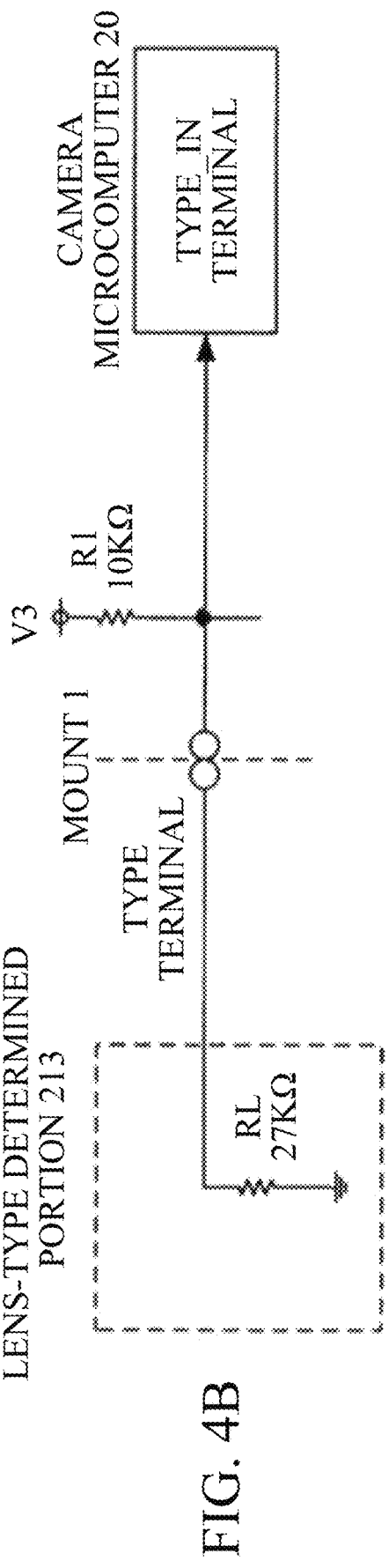

Next, a description will be given of a configuration example of the lens-type determined portion 213 as a determined portion with reference to FIGS. 4A and 4B. FIGS. 4A and 4B are explanatory diagrams illustrating the lens-type determined portion 213. The lens-type determined portion 213 has the resistor RL disposed between the GND and the TYPE terminal (1-5) provided on the mount 1. A resistor value of the resistor RL is set in advance to a value corresponding to the type of the interchangeable lens. For example, the resistor RL provided in the first lens apparatus illustrated in FIG. 4A is set to 2.4 KΩ, and the resistor RL provided in the second lens apparatus illustrated in FIG. 4B is set to 27 KΩ.

In the camera main body 10, a resistor R1 (for example, 10 KΩ) as a camera side resistor is connected between the TYPE terminal in the mount 1 and a voltage (V3) of the power for operating the camera microcomputer 20, and the TYPE terminal is connected to the TYPE_IN terminal in the camera microcomputer 20. The TYPE_IN terminal in the camera microcomputer 20 has an A/D conversion function, which is a 10-bit A/D conversion function here.

Next, a description will be given of an operation of the camera microcomputer 20 in type determination on the interchangeable lens. The camera microcomputer 20 determines the type of the attached interchangeable lens based on the voltage value input to the TYPE_IN terminal. Specifically, the camera microcomputer 20 performs A/D conversion on an input voltage value, and determines the lens type by comparing the A/D converted value with a lens type determination reference which is stored in advance in the camera microcomputer 20.

For example, when the first lens apparatus is attached, the A/D converted value of the voltage input to the TYPE_IN terminal is a resistance ratio RL/(R1+RL), wherein R1 is 10 KΩ and RL is 2.4 KΩ, and is determined to be about "0x00C6". Thus, the camera microcomputer 20 detects that the A/D converted value at the TYPE_IN terminal is within a range of "0x0047 to 0x0145" which is a first lens type determination reference, and determines that the attached interchangeable lens is the first lens apparatus. On the other hand, when the second lens apparatus is attached, the A/D converted value of the voltage input to the TYPE_IN terminal is a resistance ratio RL/(R1+RL), wherein R1 is 10 KΩ and RL is 27 KΩ, and is determined to be about "0x02EB". Thus, the camera microcomputer 20 detects that the A/D converted value at the TYPE_IN terminal is within a range of "0x026C to 0x036A" which is a second lens type determination reference, and determines that the attached interchangeable lens is the second lens apparatus.

As described above, the camera microcomputer 20 determines the type of the attached interchangeable lens 100 based on the voltage value (A/D converted value) input to the TYPE_IN terminal. Thereafter, a logic output from the CNT_V_OUT terminal is controlled depending on the determination result on the type of the interchangeable lens 100. Specifically, when the camera microcomputer 20 determines based on the voltage value at the TYPE_IN terminal that the attached interchangeable lens 100 is the first lens apparatus, the camera microcomputer 20 outputs H from the CNT_V_OUT terminal and provides a control so that the communication voltage is V1. When the camera microcomputer 20 determines based on the voltage value at the TYPE_IN terminal that the attached interchangeable lens 100 is the second lens apparatus, the camera microcomputer 20 outputs L from the CNT_V_OUT terminal and provides a control so that the communication voltage is V2.

When as the voltage value (A/D converted value) at the TYPE_IN terminal, a voltage value not included in ranges of the first and second lens type determination references is detected, the camera microcomputer 20 determines that a "unsupported lens", which is an interchangeable lens that the camera main body 10 does not support, is attached. Alternatively, the camera microcomputer 20 determines that the lens type determination cannot be performed properly, and the determination is reserved. In these cases, the camera microcomputer 20 does not communicate with the interchangeable lens 100.

Figure 5:
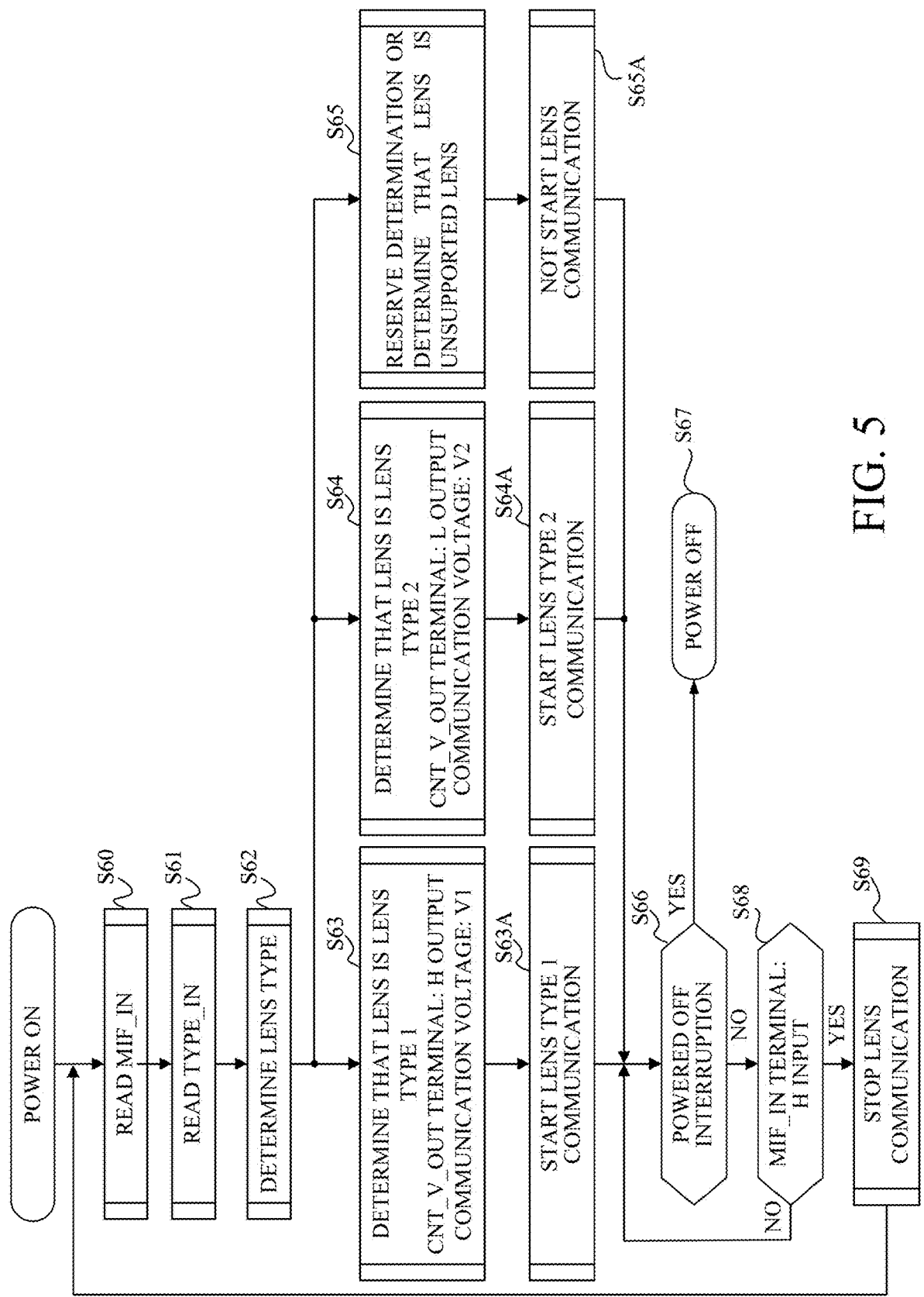
FIG. 5 is a flowchart illustrating lens type determination processing according to the embodiment.

Next, a description will be given of the determination processing, which will be also referred to as lens type determination processing, on the type of the interchangeable lens 100 with reference to FIG. 5. FIG. 5 is a flowchart illustrating the lens type determination processing. Each step in FIG. 5 is mainly executed by the camera microcomputer 20 according to a computer program stored in the memory 16.

First, in step S60, the camera microcomputer 20 reads a voltage value H or L from the MIF_IN terminal. Subsequently, in step S61, the camera microcomputer 20 reads the voltage value at the TYPE_IN terminal. Steps S60 and S61 do not have to be performed in this order, and steps S60 and S61 may be performed at the same time, for example.

Subsequently, in step S62, the camera microcomputer 20 determines the type of the attached interchangeable lens 100 as described above based on the voltage value at the TYPE_IN terminal. When the camera microcomputer 20 determines that the attached interchangeable lens 100 is the first lens apparatus of the lens type 1, the camera microcomputer 20 outputs H from the CNT_V_OUT terminal and sets the communication voltage to V1 in step S63, and the process proceeds to step S63A. On the other hand, when the camera microcomputer 20 determines in step S62 that the attached interchangeable lens 100 is the second lens apparatus of the lens type 2, the camera microcomputer 20 outputs L from the CNT_V_OUT terminal and sets the communication voltage to V2 in step S64, and the process proceeds to step S64A. When the camera microcomputer 20 determines in step S62 that the attached interchangeable lens 100 is neither the first nor the second lens apparatus, the camera microcomputer 20 determines that the "unsupported lens" is attached or reserves the determination (determines that the determination is to be "reserved") in step S65, and the process proceeds to step S65A so that processing for the "unsupported lens" or the reservation is performed.

In step S63A and step S64A, the camera microcomputer 20 starts communication with the interchangeable lens 100 at the set communication voltage. In step S65A, the camera microcomputer 20 does not start communication with the attached interchangeable lens 100, but performs processing such as giving a warning to the user.

Subsequently, in step S66, the camera microcomputer 20 determines whether or not an interruption of being powered off, which will be also referred to as a powered off interruption, has been caused by a turning off operation on the power switch. When the powered off interruption has been caused, the process proceeds to step S67, and the camera microcomputer 20 performs processing for powering off. On the other hand, when the interruption of turning off the power has not been caused in step S66, the process proceeds to step S68. In step S68, the camera microcomputer 20 determines whether or not H is input from the MIF_IN terminal, that is, whether or not the interchangeable lens 100 has been removed from the camera main body 10. When H is input from the MIF_IN terminal, the camera microcomputer 20 proceeds to step S69, stops communication with the interchangeable lens 100, and returns to step S60. On the other hand, when H is not input from the MIF_IN terminal, the camera microcomputer 20 returns to step S66. By performing such communication processing, the camera controller 18 can determine the type of the attached interchangeable lens 100.

In this embodiment, as a method for determining the type of the attached interchangeable lens 100, the method has been described with which determination is made based on the voltage value input to the TYPE_IN terminal, but the method is not limited to this, and other determination methods may also be applied. For example, a method may be also used which does not perform the lens type determination and the setting of the output voltage based on the lens type from step S61 to step S65, and determines the lens type by receiving information on the lens type from the interchangeable lens 100 immediately after step S63A.

Figures 6, 7A:
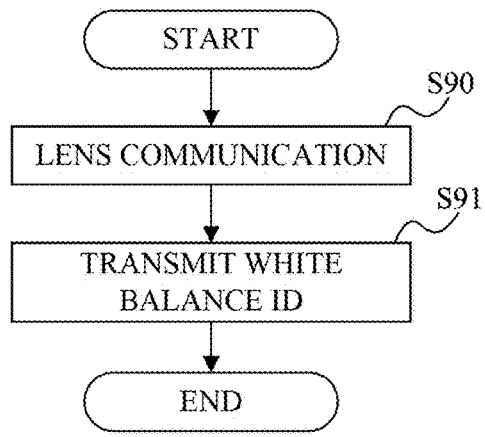
FIG. 6 is a table illustrating a relationship between a lens type, a white balance ID, and white balance selected by a camera main body according to the embodiment.
FIGS. 7A and 7B are flowcharts illustrating lens communication with the interchangeable lens and development processing by an image processor according to the embodiment.

Next, with reference to FIG. 6, a description will be given of processing for reducing difference in hue of pickup images caused by characteristics (color characteristics) of the interchangeable lens 100 during the development processing performed by the image processor 13. FIG. 6 is a table indicating a correspondence between a lens type, a white balance ID, and white balance selected by the camera main body 10 during the development processing performed by the image processor 13.

Conventionally, the camera main body has selected white balance for the lens type 1 when a lens of the lens type 1 is used, and the camera main body has selected white balance for the lens type 2 when a lens of the lens type 2 is used. However, if the camera main body selects the white balance for the lens type 1, it may be difficult to reduce the size and cost. Therefore, this embodiment provides an ID, which will be referred to as a white balance ID or a WBID, for selecting the white balance when a lens of the lens type 1 is used so that the camera main body selects the white balance for the lens type 2 when the lens of the lens type 1 is used. When the WBID is 0 indicating invalidity, the white balance for the same lens type as the attached lens type is selected. On the other hand, when the lens of the lens type 1 is used and the WBID is 1, the camera main body selects the white balance for the lens type 2. When another ID number such as the WBID of 2 is provided, it is possible to select white balance for a lens type 3, which is different from the lens type 1 and the lens type 2.

Next, a description will be given of lens communication by the lens controller 103 in the interchangeable lens 100 and the development processing by the image processor 13 with reference to FIGS. 7A and 7B. FIG. 7A is a flowchart illustrating the lens communication by the interchangeable lens 100. First, in step S90, the lens communication is performed between the lens controller 103 in the interchangeable lens 100 and the camera controller 18 connected to the lens controller 103 in the camera main body 10. In the lens communication, the camera controller 18 transmits the information on the camera main body 10 to interchangeable lens 100, and the lens controller 103 transmits information on the interchangeable lens 100 to the camera main body 10. In a series of processing in the lens communication, in step S91, the interchangeable lens 100 transmits WBID information, i.e., white balance ID information, to the camera main body 10.

Figure 7B:
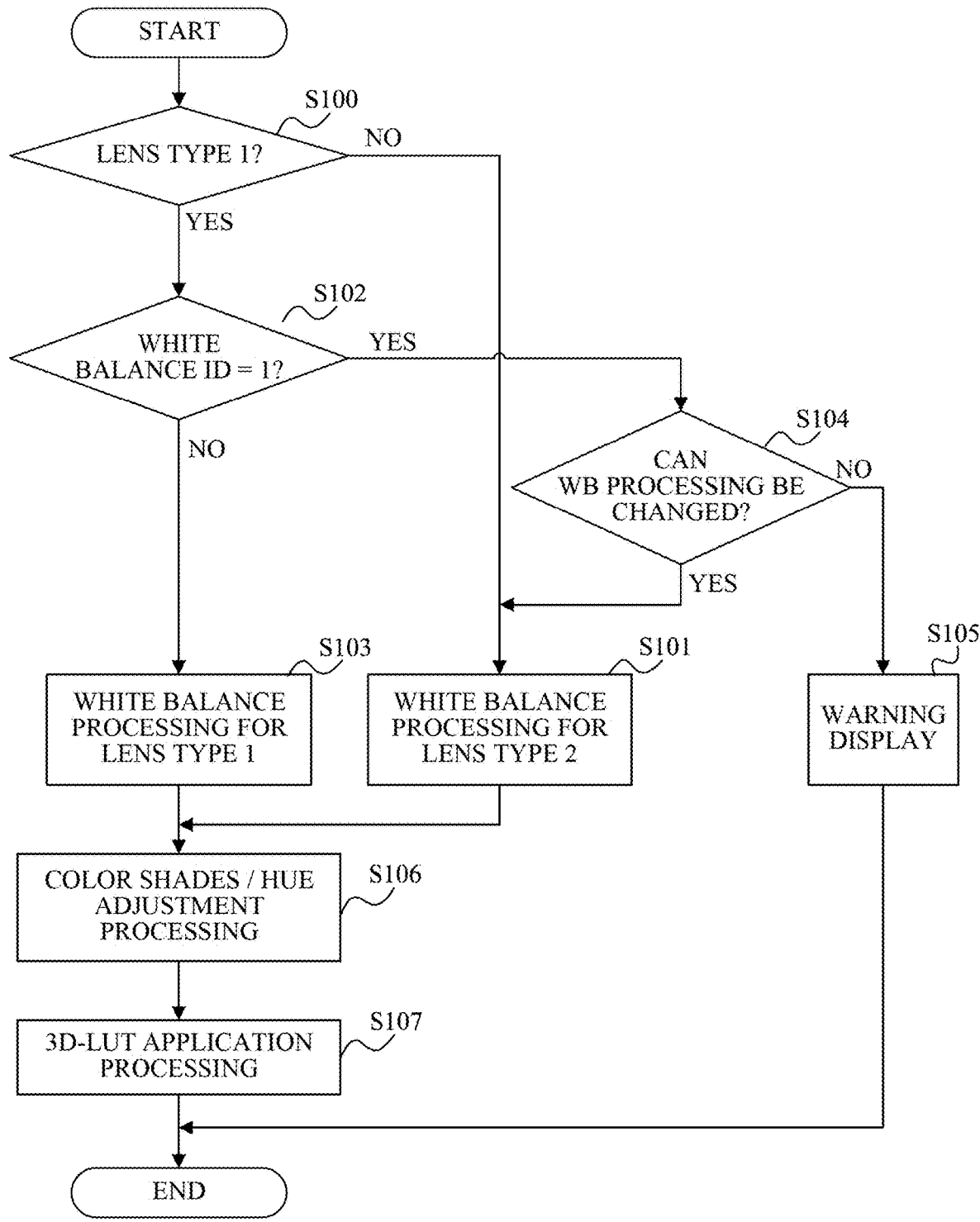

FIG. 7B is a flowchart illustrating the development processing by the image processor 13. First, in step S100, the camera controller 18 determines whether or not the lens type, which is the type of the interchangeable lens attached to the camera main body 10, is the lens type 1. When the lens type is the lens type 2, the process proceeds to step S101, and the image processor 13 performs white balance processing for the lens type 2.

On the other hand, when the lens type is the lens type 1 in step S100, the process proceeds to step S102, and the camera controller 18 determines whether or not the WBID received from the interchangeable lens 100 is "1". When the WBID is "0", the process proceeds to step S103, and the image processor 13 performs white balance processing for the lens type 1. On the other hand, when the WBID is "1", the process proceeds to step S104, and the image processor 13 confirms whether or not it is possible to change the processing to the white balance processing for the lens type 2. When it is possible to change the processing to the white balance processing for the lens type 2, the process proceeds to step S101. In step S101, although the lens type of the attached interchangeable lens 100 is the lens type 1, the image processor 13 performs the white balance processing for the lens type 2. On the other hand, when it is not possible to change the processing to the white balance processing for the lens type 2, the process proceeds to step S105, and the image processor 13 provides a warning display on the display 14.

Figures 8, 9:
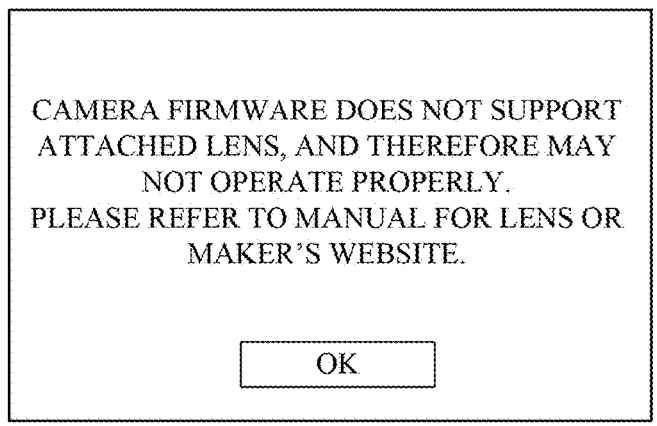
FIG. 8 is a diagram illustrating an example of a warning display according to the embodiment.
FIG. 9 is a diagram illustrating an example of a data structure of white balance coefficient data according to the embodiment.

FIG. 8 is a diagram illustrating an example of the warning display, and the display prompts a user to update a firmware of the camera main body 10. The processing in steps S101 and S103 in FIG. 7B is processing performed by the white balance processor 130. Step S103 is processing for applying white balance specialized for an interchangeable lens of the lens type 1 to the image. Step S101 is processing for applying white balance specialized for an interchangeable lens of the lens type 2 to an image.

Generally, the camera main body 10 stores in advance respective pieces of white balance coefficient data corresponding to a plurality of light sources, and the light source can be selected by the user. Here, a white balance coefficient is a gain value applied to the signals of R, G, and B included in the image. The white balance coefficients for R, G, and B are respectively indicated by WbGainR, WbGainG, and WbGainB, R, G, and B values before the white balance adjustment are respectively indicated by R0, G0, and B0, and R, G, and B values after the white balance adjustment are respectively indicated by R1, G1, and B1. The white balance adjustment processing can be expressed as follows. The white balance can be applied by performing calculation according to the following expressions (1) to (3) for each of all pixels in the image.

$$R1 = WbGainR \times R0 \quad (1)$$

$$G1 = WbGainG \times G0 \quad (2)$$

$$B1 = WbGainB \times B0 \quad (3)$$

FIG. 9 is a diagram illustrating an example of a data structure of the white balance coefficient data stored in the memory 16. The memory 16 stores white balance coefficients corresponding to sunlight, shade, cloudiness, and the like as light sources for each lens type. That is, when white balance application processing specialized for a lens of the lens type 1 is performed, the white balance coefficients stored in an area for the lens type 1 in FIG. 9 is used. When white balance application processing specialized for a lens of the lens type 2 is performed, the white balance coefficients stored in an area for the lens type 2 in FIG. 9 is used. As the white balance coefficients for the lens type 1 and the white balance coefficients for the lens type 2, optimum values when each lens is used may be acquired experimentally in advance. As described above, the white balance coefficients to be used is changed depending on the lens type, and thereby it is possible to reduce a color cast in the image caused by the effect of color characteristic which is different between the lens types.

Subsequently, in step S106 in FIG. 7B, the color processor 131 adjusts color shades and a hue of the image. Subsequently, in step S107, the color processor 131 performs color space conversion processing using the 3D-LUT (three-dimensional look-up table) so as to reproduce a desired color. The 3D-LUT is a table specifying R, G, and B values in output with respect to R, G, and B values in input, and is stored in the memory 16.

Here, a description will be given of a color space conversion method using both the 3D-LUT and three-dimensional interpolation calculation. The input digital image signals of R, G, and B are separated into high-order bits and low-order bits. The high-order bits are used to extract a plurality of reference values required for the interpolation calculation performed using the 3D-LUT. The low-order bits are used as weight coefficients g in the interpolation calculation. The interpolated value is calculated by a multiply-accumulation operation on the weight coefficient g and the reference value extracted from the 3D-LUT.

Figure 10:
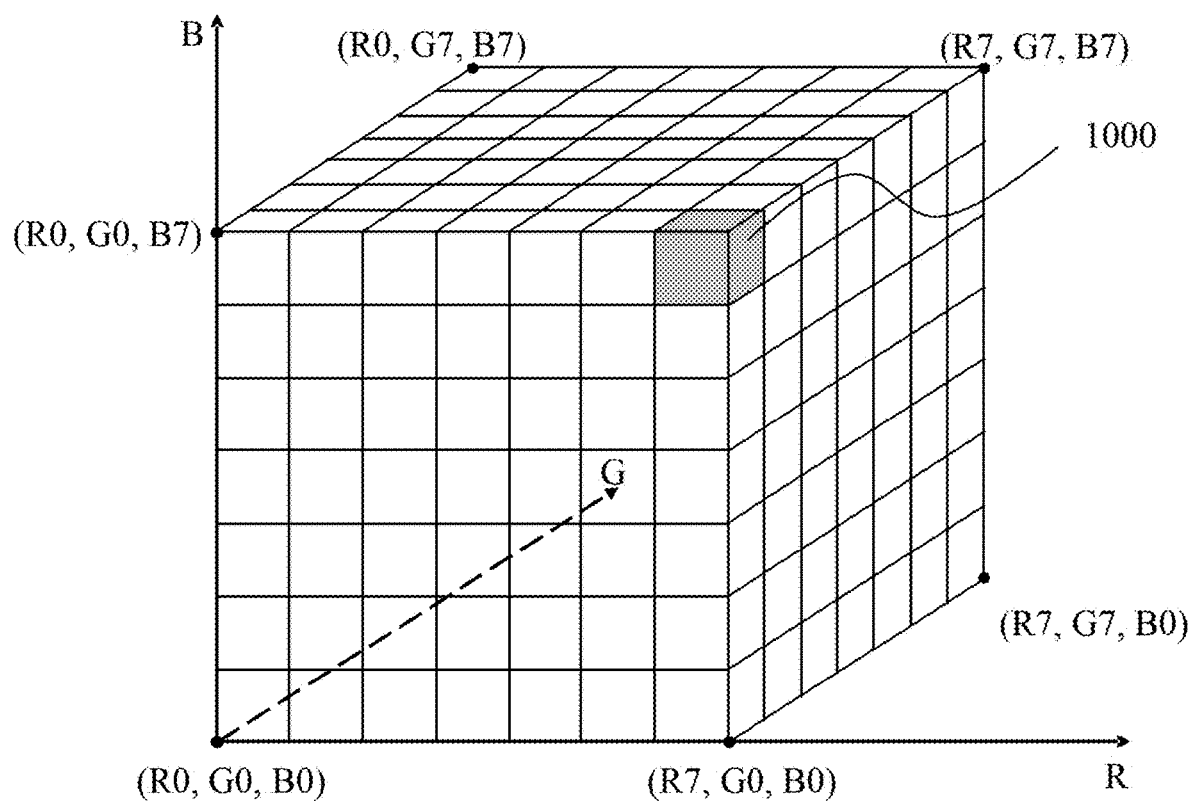
FIG. 10 is a diagram schematically illustrating a 3D-LUT in a color space according to the embodiment.

FIG. 10 is a diagram schematically illustrating a state in which a color space, which is an RGB space, of three-dimensional input is divided into unit solids by dividing the color space, which is the RGB space, by a limited number in each axial direction. Respective pieces of color data after color space conversion at the vertexes of the unit solids are stored on the 3D-LUT as reference values. The high-order bits of the three digital image signals are regarded as coordinates in the color space, a unit solid is selected that is used in the interpolation calculation (for example, a unit solid 1000 illustrated in FIG. 10), and reference values corresponding to vertexes of the unit solid is used in the interpolation calculation.

As a method of three-dimensional interpolation calculation used at this time, a tetrahedron interpolation method may be used. FIGS. 11A to 11G are explanatory diagrams of the tetrahedron interpolation method. The tetrahedron interpolation method is performed as illustrated in FIGS. 11B to 11G. That is, the unit solid (for example, the unit solid 1000 illustrated in FIG. 10) is divided into six tetrahedrons (hereinafter, the six divided tetrahedrons are referred to as Type 0 to Type 5, respectively), and the interpolation calculation is performed using the following expressions, depending on which tetrahedron the input coordinates are included in.

Figure 11A:
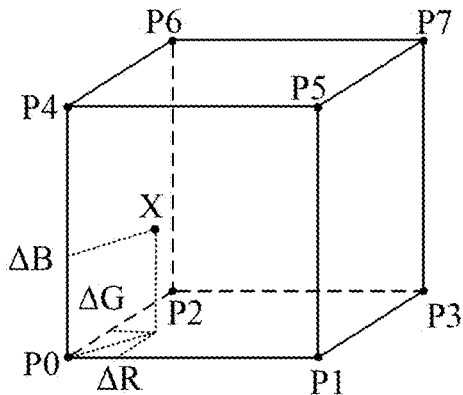
FIGS. 11A to 11G are explanatory diagrams illustrating a tetrahedron interpolation method as an example of three-dimensional interpolation calculation according to the embodiment.
Figure 11B:
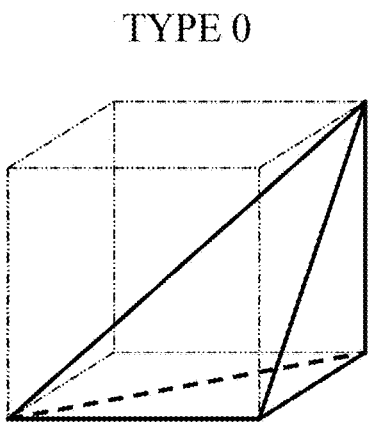
Figure 11C:
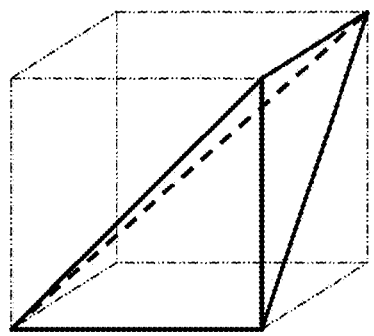
Figure 11D:
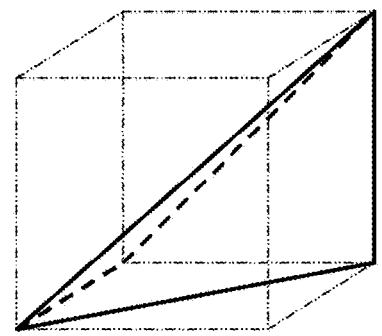
Figure 11E:
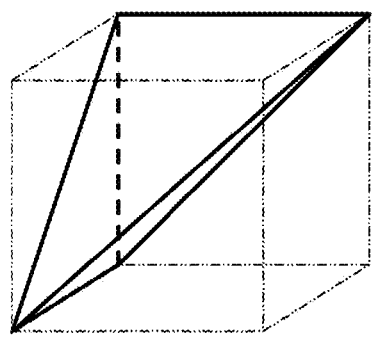
Figure 11F:
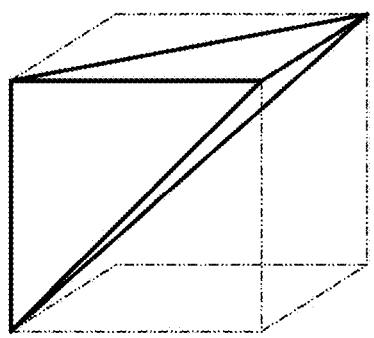
Figure 11G:
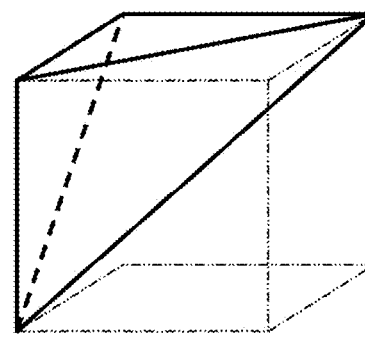

In the following expressions, the reference values corresponding to the vertexes of the unit solid illustrated in FIG. 11A are respectively indicated by P0 to P7, and the weight coefficients g are indicated by $\Delta R$, $\Delta G$, and $\Delta B$. Which tetrahedron is selected among the tetrahedrons of the Type 0 to the Type 5 is determined by a magnitude relationship of these weight coefficients $\Delta R$, $\Delta G$, and $\Delta B$.

In a case of Type 0 ($\Delta R>\Delta G>\Delta B$), $$X=P0+(P1-P0)\times\Delta R+(P3-P0)\times\Delta G+(P7-P0)\times\Delta B \quad (4)$$

In a case of Type 1 ($\Delta R>\Delta B>\Delta G$), $$X=P0+(P1-P0)\times\Delta R+(P7-P0)\times\Delta G+(P5-P0)\times\Delta B \quad (5)$$

In a case of Type 2 ($\Delta G>\Delta R>\Delta B$), $$X=P0+(P3-P0)\times\Delta R+(P2-P0)\times\Delta G+(P7-P0)\times\Delta B \quad (6)$$

In a case of Type 3 ($\Delta G>\Delta B>\Delta R$), $$X=P0+(P7-P0)\times\Delta R+(P2-P0)\times\Delta G+(P6-P0)\times\Delta B \quad (7)$$

In a case of Type 4 ($\Delta B>\Delta R>\Delta G$), $$X=P0+(P5-P0)\times\Delta R+(P7-P0)\times\Delta G+(P4-P0)\times\Delta B \quad (8)$$

In a case of Type 5 ($\Delta B>\Delta G>\Delta R$), $$X=P0+(P7-P0)\times\Delta R+(P6-P0)\times\Delta G+(P4-P0)\times\Delta B \quad (9)$$

By performing the color space conversion processing using the 3D-LUT in step S104 in FIG. 7B, the development processing in the image processor 13 is completed.

Figure 12A:
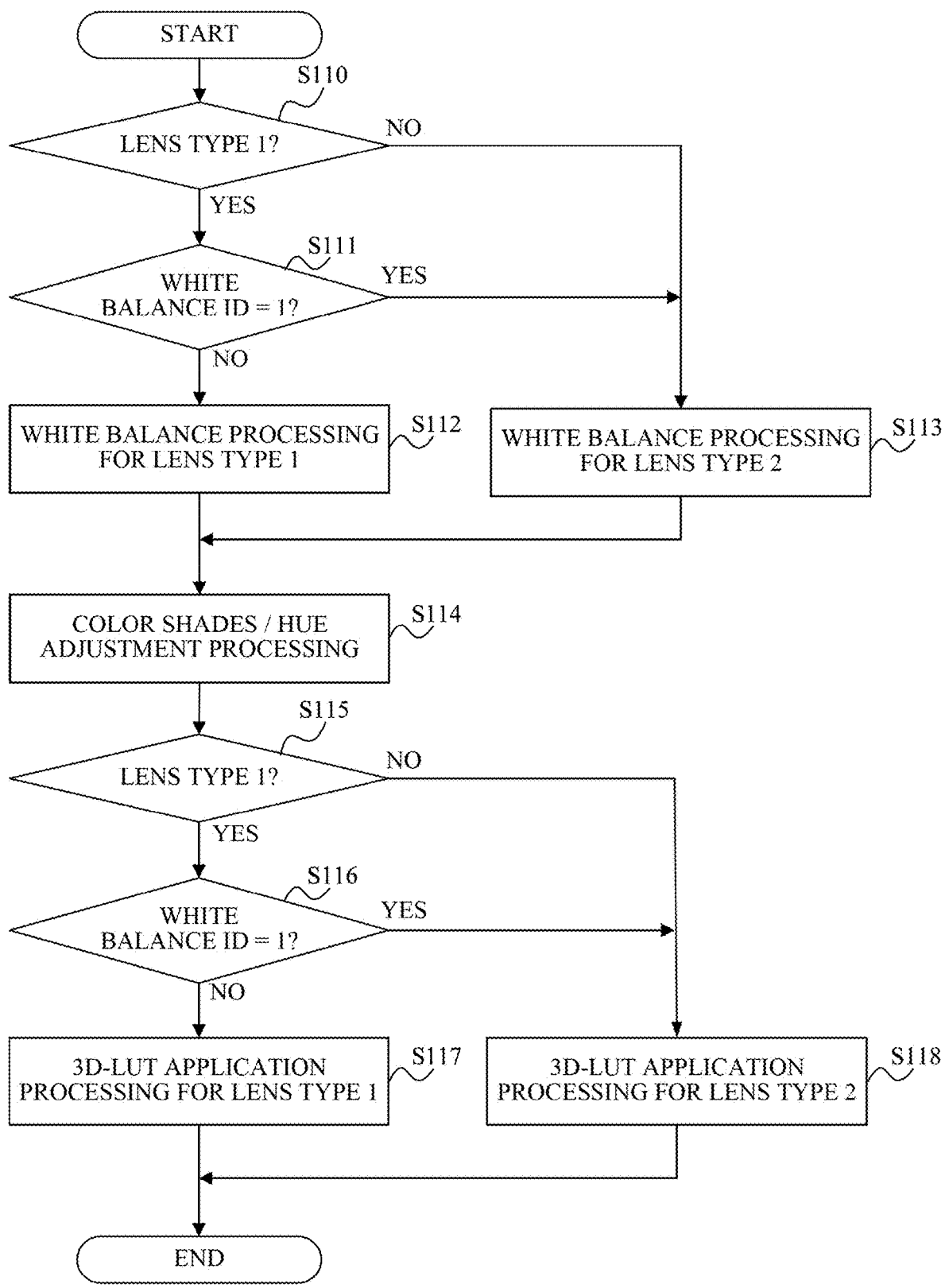
FIGS. 12A and 12B are flowcharts illustrating another example of development processing by the image processor according to the embodiment.
Figure 12B:
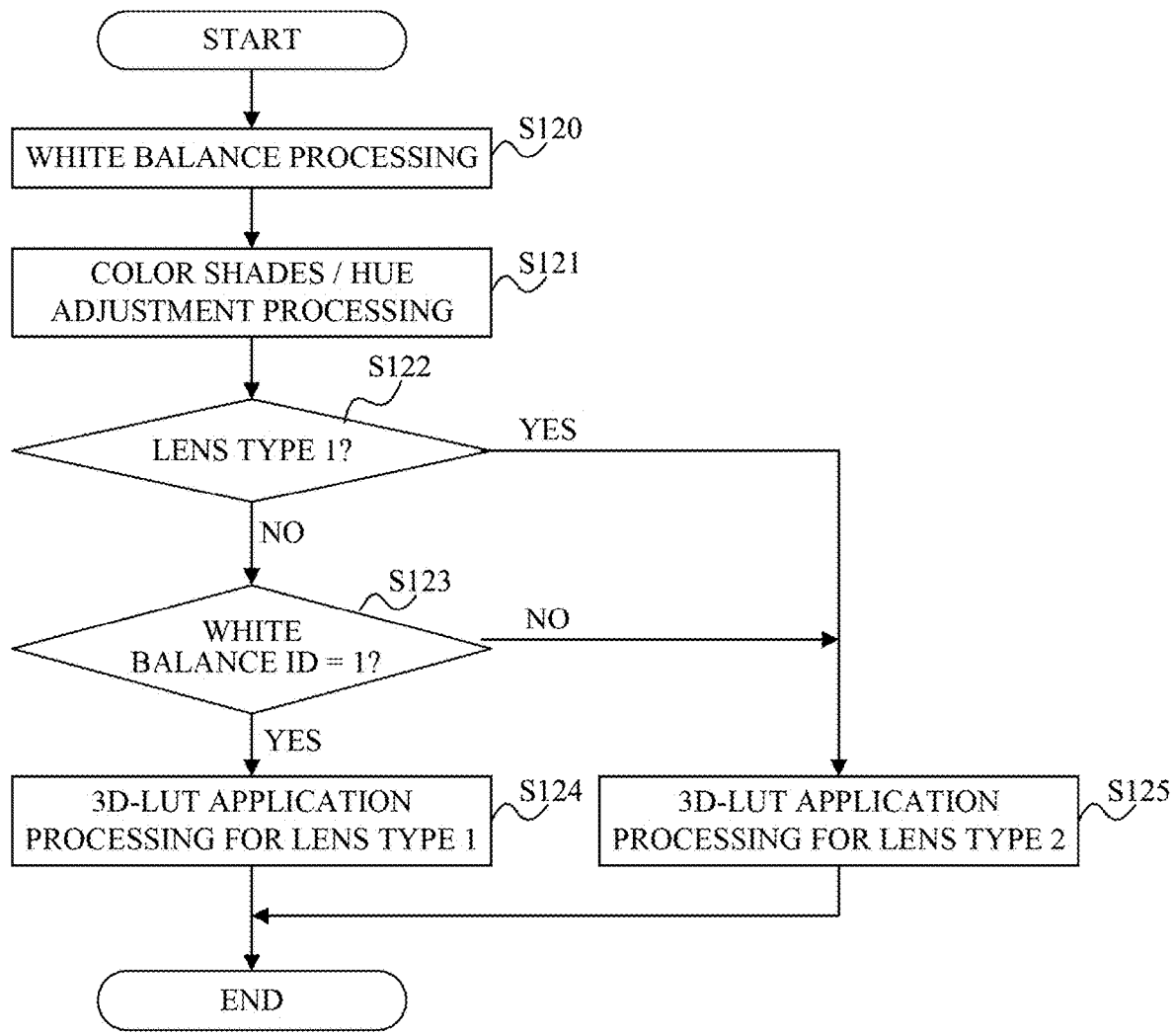

As the development processing performed by the image processor 13, as illustrated in FIGS. 12A and 12B, a method may be used of storing the 3D-LUT for each lens type and changing the 3D-LUT depending on the used lens. FIG. 12A is a flowchart illustrating another example of development processing by the image processor 13. In FIG. 12A, for simplification of the description, a description will be omitted regarding the warning display described in the flowcharts in FIGS. 7A and 7B. Steps S110 to S114 are the same as the above-mentioned processing flow.

In step S115, the camera controller 18 determines the lens type. In step S116, the camera controller 18 determines whether or not the WBID received from the interchangeable lens 100 is "1". In step S117 or S118, the camera controller 18 performs color space conversion processing using the 3D-LUT corresponding to the lens type based on the WBID information. The 3D-LUT used here is prepared in advance with a difference in the color characteristics of the lenses taken into consideration, and by changing the 3D-LUT to be used depending on the lens type, the hues of the images can be matched in more detail even if the color characteristics of the lenses are different.

In this case, the 3D-LUT data structure stored in the memory 16 has a structure of storing 3D-LUTs for the lens type 1 and the lens type 2, respectively, as illustrated in FIG. 13. FIG. 13 is a diagram illustrating an example of a data structure of the 3D-LUTs corresponding to the lens types. The 3D-LUT to be used is determined depending on the lens type. One block in the data structure illustrated in FIG. 13 corresponds to the color data after color space conversion at vertexes of a unit solid illustrated in FIG. 10.

By reflecting the color cast in the image caused by the difference in the color characteristics of the lenses, which is reduced by white balance processing corresponding to the lens type, in the 3D-LUTs in advance, it is also possible to reduce the difference in the color characteristics of the lenses only with the 3D-LUTs. The processing flow in that case is as illustrated in FIG. 12B. First, in step S120, the white balance processor 130 applies white balance processing that does not depend on the lens type. Subsequently, in step S121, the color processor 131 adjusts the color shades and the hue of the image. In the following steps S122 to S125, the camera controller 18 uses the 3D-LUT corresponding to the lens type.

As described above, by changing the white balance processing and the 3D-LUT depending on the lens type, it is possible to reduce the difference in the hue of the image caused by the difference in the color characteristics of the lenses.

Figure 14:
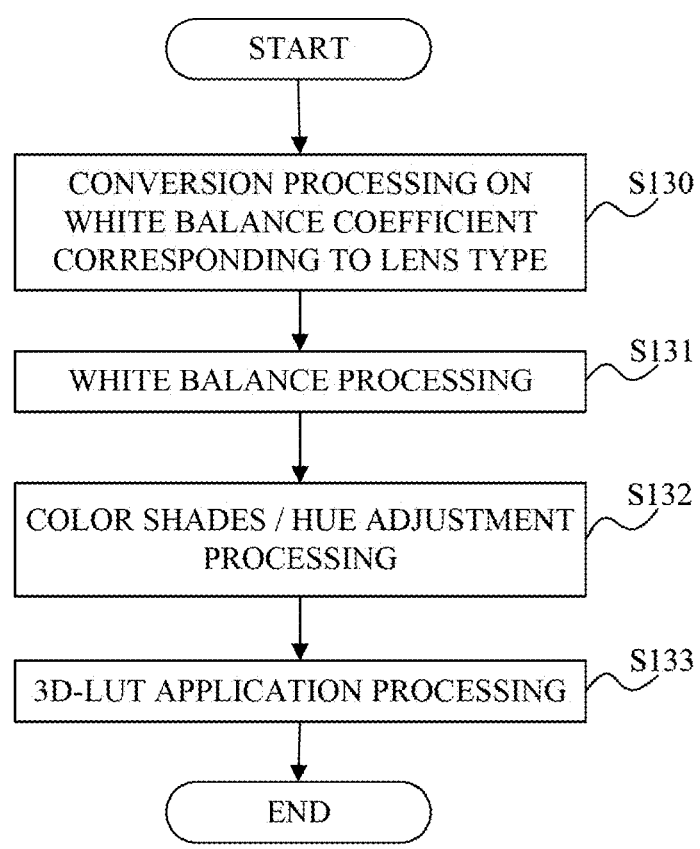
FIG. 14 is a flowchart illustrating still another example for development processing by the image processor according to the embodiment.

Here, a description has been given for changing of the white balance coefficients depending on the lens type as the white balance processing corresponding to the lens type, but the conversion of the white balance coefficients may be performed based on conversion coefficients calculated in advance based on spectral transmittances of the lenses. The processing flow in that case is as illustrated in FIG. 14. FIG. 14 is a flowchart illustrating still another example of the development processing by the image processor 13. In FIG.

14, steps S131 to S133 are the same as the above-described processing, and thus the description thereof will be omitted.

Prior to the processing for applying the white balance in step S131, in step S130, the image processor 13 performs conversion processing on the white balance coefficients corresponding to the lens type. The white balance coefficients stored in the camera main body 10 is only the white balance coefficients corresponding to the lens type 1, and adjustment values AdjR, AdjG, and AdjB are stored in camera main body 10 for converting the white balance coefficients for the lens type 1 into the white balance coefficients for the lens type 2. This conversion is performed by using the following expressions (10) to (12).

Here, WbGainR1, WbGainG1, and WbGainB1 indicates white balance coefficients corresponding to the lens type 1 stored in the camera, and WbGainR2, WbGainG2, and WbGainB2 indicates converted white balance coefficients.

$$WbGainR2 = AdjR \times WbGainR1 \quad (10)$$

$$WbGainG2 = AdjG \times WbGainG1 \quad (11)$$

$$WbGainB2 = AdjB \times WbGainB1 \quad (12)$$

This conversion coefficient may be set to a value that matches hues of images after the white balance application, based on the color characteristic of the spectral transmittance of the lens.

Since the white balance coefficients is converted as described above, it is not necessary to store the white balance coefficients for each lens type. If there are multiple lens types to be subjected, it is only necessary to store the conversion coefficient for each lens type.

In this embodiment, an example has been described of the white balance coefficients corresponding to the light source at the time of image pickup as the changing of the white balance processing, but the changing is not limited to this. For example, in auto white balance processing (AWB), which automatically determines the white balance coefficients based on an image, the processing can be changed depending on the lens type as well.

AWB is generally processing for reproducing white of a white object in an image by equalizing RGB. Various methods have been proposed for AWB, and one method is to detect a white object area in an image and determine the white balance coefficients that make the area white. When the white object area is to be detected from an image, in general, a white detection area which is determined as white in a color space is set, and the white object area is detected depending on whether or not the area falls within a range of the set white detection area. By changing this white detection area depending on the lens type, proper AWB can be performed even if the spectral transmittances of the lenses are different.

Figure 15B:
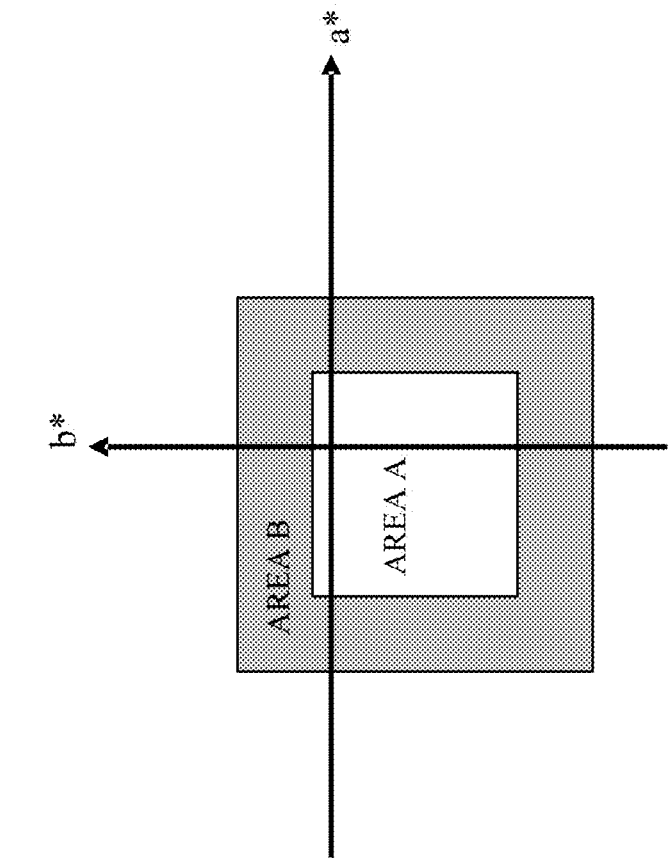
FIGS. 15A and 15B are diagrams illustrating a setting example of a white detection area corresponding to the lens type according to the embodiment.
Figure 15A:
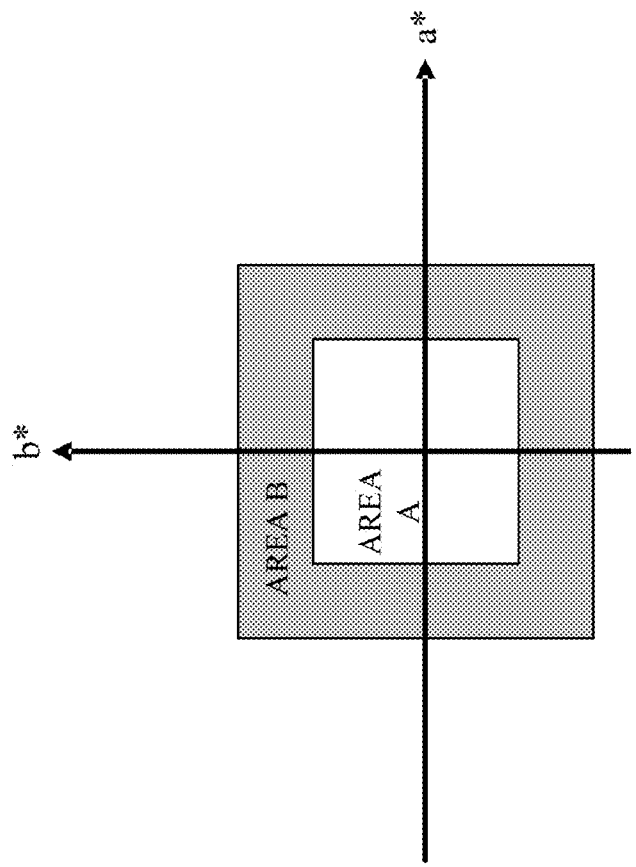

Here, an outline of the AWB in this embodiment will be described with reference to FIGS. 15A and 15B. FIGS. 15A and 15B are diagrams illustrating a setting example of a white detection area corresponding to the lens type. FIG. 15A illustrates a white detection area, i.e., a first white detection area, for the interchangeable lens (first lens apparatus) of the lens type 1 (first type), and FIG. 15B illustrates a white detection area, i.e., a second white detection area for the interchangeable lens (second lens apparatus) of the lens type 2 (second type).

In FIG. 15A, for each pixel included in the input image before the white balance application, the white object area is a pixel whose UV value acquired by converting RGB to YUV is included in an area A or an area B illustrated in the drawing. The white balance coefficients are calculated by detecting all the pixels included in this white detection area in the image and calculating respective averages of the R, G, and B values in the detected pixels. At that time, a weighted average with weights in the area A and the area B different is used. Specifically, the calculation is performing by using the following expressions (13) to (15). In the expressions (13) to (15), WbGainR, WbGainG, and WbGainB indicate the respective calculated white balance coefficients of R, G, and B, and Ra, Ga, and Ba indicate the respective averages of the R, G, and B values in the pixels included in the area A of the white detection area. Rb, Gb, and Bb indicate the respective averages of the R, G, and B values in the pixels included in the area B of the white detection area, and wA and wB indicate the weights for the area A and the area B, respectively.

$$WbGainR = (Ga \times wA + Gb \times wB)/(Ra \times wA + Rb \times wB) \quad (13)$$

$$WbGainG = 1 \quad (14)$$

$$WbGainB = (Ga \times wA + Gb \times wB)/(Ba \times wA + Bb \times wB) \quad (15)$$

As the white detection area used in such AWB processing, the white detection area illustrated in FIG. 15A is used when the lens is the lens type 1, and the white detection area illustrated in FIG. 15B is used when the lens is the lens type 2. The white detection area suitable for characteristics of a lens can be experimentally acquired by using an image obtained in advance using the lens. As a method of determining the white detection area, a range of an object included in a white detection area in an image obtained using a lens of the lens type 1 is set so that it matches a range of an object included in a white detection area in an image obtained by using a lens of the lens type 2. Thereby, the respective object areas regarded as white objects are the same between the lens type 1 and the lens type 2, and thus the calculation results in the AWB match. If the respective white detection areas of the lens type 1 and the lens type 2 do not match, the calculation results of the AWB are different because the object areas used in the AWB are different. Thus, if the hue of the image differs depending on the lens, the results do not match even when the same white detection area is used. Further, it is clear from the above-described AWB principle that the results do not match when the white balance coefficients calculated using the same white detection area is converted based on the spectral transmittance.

Such information on the white detection area corresponding to the lens type may be stored as a parameter for each lens type, but only the white detection area corresponding to one lens type may be stored as a parameter and the other white detection area may be calculated by using the above-described stored conversion coefficients.

Figures 16A, 16B:
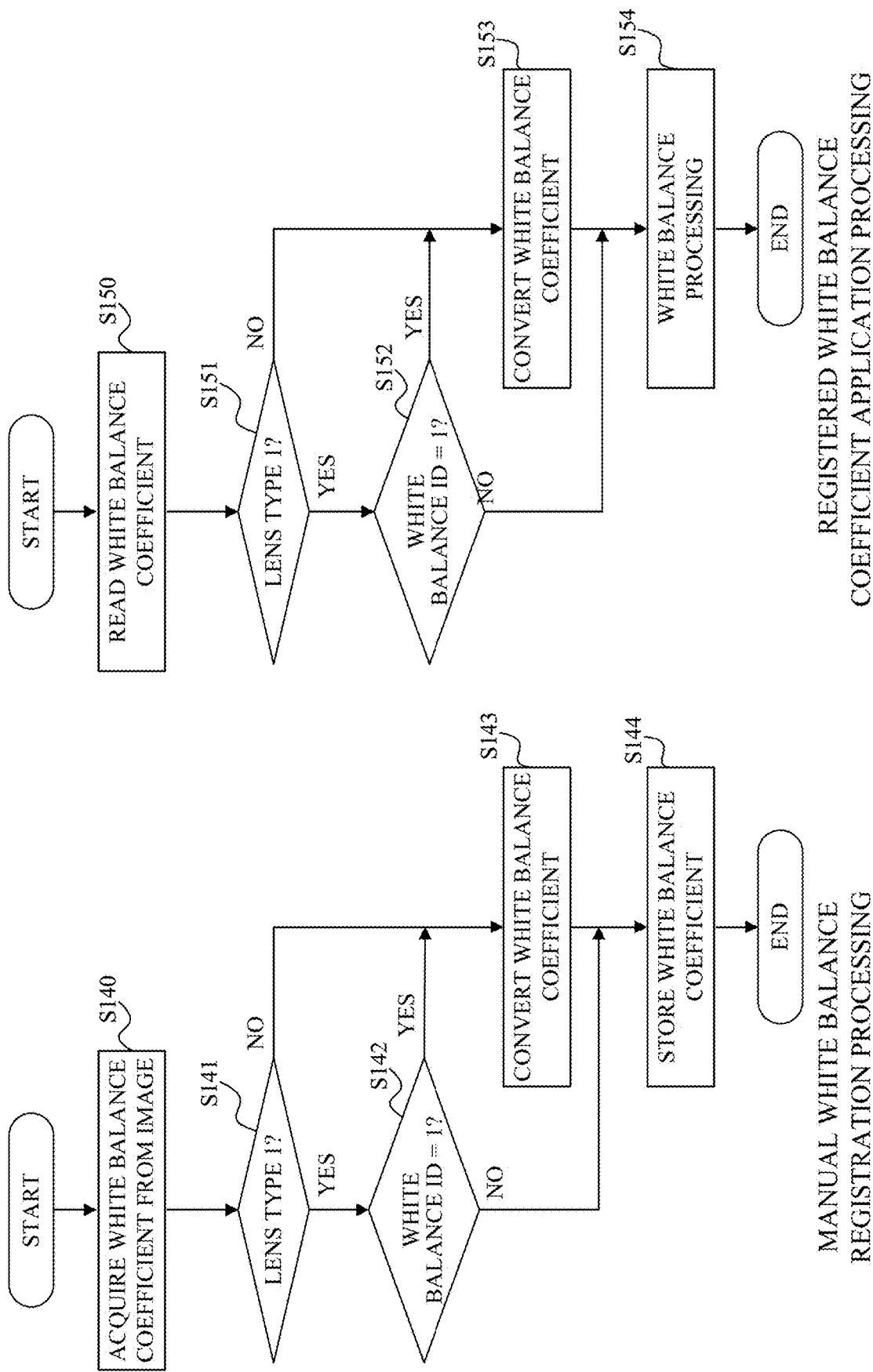
FIGS. 16A and 16B are flowcharts illustrating examples for manual white balance registration processing and manual white balance application processing according to the embodiment.

Next, a description will be given of a method for realizing a manual white balance function in this embodiment with reference to FIGS. 16A and 16B. FIGS. 16A and 16B are flowcharts illustrating respective examples of manual white balance registration processing and manual white balance application processing, respectively. The manual white balance function is a function that registers, in the camera main body 10, and uses white balance coefficients determined by the user from image data which is obtained by the user capturing an image of an object area to be reproduced as white.

The white balance coefficients once registered in the camera main body 10 can be used for subsequent image pickup, and hence when the lens used for image pickup at the time of registration and the lens used for image pickup at the time of use are different, it may not be possible to reproduce proper white. Therefore, in the camera main body 10 in this embodiment, the processing illustrated in FIGS. 16A and 16B is performed. In FIGS. 16A and 16B, for simplifying the description, a description regarding the warning display in step S105 in FIG. 7B will be omitted.

FIG. 16A is a flowchart of white balance coefficient registration processing. First, in step S140, the camera controller 18 calculates the white balance coefficients WbGainR, WbGainG, and WbGainB from the respective average values R, G, and B of the R, G, and B values in an area near center of a pickup image as expressed by the following expressions (16) to (18).

$$WbGainR = G/R \quad (16)$$

$$WbGainG = 1 \quad (17)$$

$$WbGainB = G/B \quad (18)$$

By using the R, G, and B values in the area near the center of the image as described above, the white balance coefficients corresponding to the object area to be reproduced as white captured by the user is acquired.

Subsequently, in step S141, the lens type used in capturing the image for which the white balance coefficients were acquired is determined. When the lens type is the lens type 1, the process proceeds to step S142. On the other hand, when the lens type is not the lens type 1, the process proceeds to step S143. In step S142, the camera controller 18 determines whether or not the WBID is "1". When the WBID is "1", the process proceeds to step S143. On the other hand, when the WBID is not "1", the process proceeds to step S144.

In step S143, the camera controller 18 performs conversion processing on the calculated white balance coefficients using the coefficients AdjR, AdjG, and AdjB as coefficients for conversion, as expressed by the following expressions (19) to (22). Here, WbGainR', WbGainG', and WbGainB' indicate the converted white balance coefficients.

$$WbGainR' = WbGainR/AdjR \quad (19)$$

$$WbGainG' = WbGainG/AdjG \quad (20)$$

$$WbGainB' = WbGainB/AdjB \quad (21)$$

The conversion coefficients may be set to values such that hues of images match after the white balance application, based on the color characteristics of the spectral transmittance of the lens.

In step S144, the camera controller 18 registers the above-described white balance coefficients in the camera main body 10 by storing it in the memory 16.

FIG. 16B is a flowchart illustrating processing when white balance is applied to an image using the registered white balance coefficients. First, in step S150, the camera controller 18 reads the manual white balance coefficients stored in the memory 16. Subsequently, in step S151, the camera controller 18 determines the lens type used for capturing the image to which the white balance is applied. When the lens type is the lens type 1, the process proceeds to step S152. On the other hand, when the lens type is not the lens type 1, the process proceeds to step S153.

In step S152, the camera controller 18 determines whether or not the WBID is "1". When the WBID is "1", the process proceeds to step S153. On the other hand, when the WBID is not "1", the process proceeds to step S154. In a case of the lens type 2 or WBID=1, the camera controller 18 converts the white balance coefficients in step S153. The conversion coefficients AdjR, AdjG, and AdjB used in this case are set to the same values as the conversion coefficients used at the time of the white balance registration described above.

$$WbGainR = AdjR \times WbGainR' \quad (22)$$

$$WbGainG = AdjG \times WbGainG' \quad (23)$$

$$WbGainB = AdjB \times WbGainB' \quad (24)$$

That is, the registered manual white balance coefficients are values corresponding to the lens type 1, and thus the value is converted when the image pickup is performed by using a lens of the lens type 2. In step S154, the white balance coefficient application processing is performed. By converting the white balance coefficients based on the lens type at the time of registering and using the manual white balance in this way, the white balance processing can be realized that properly reproduces white regardless of the lens type.

Figure 17:
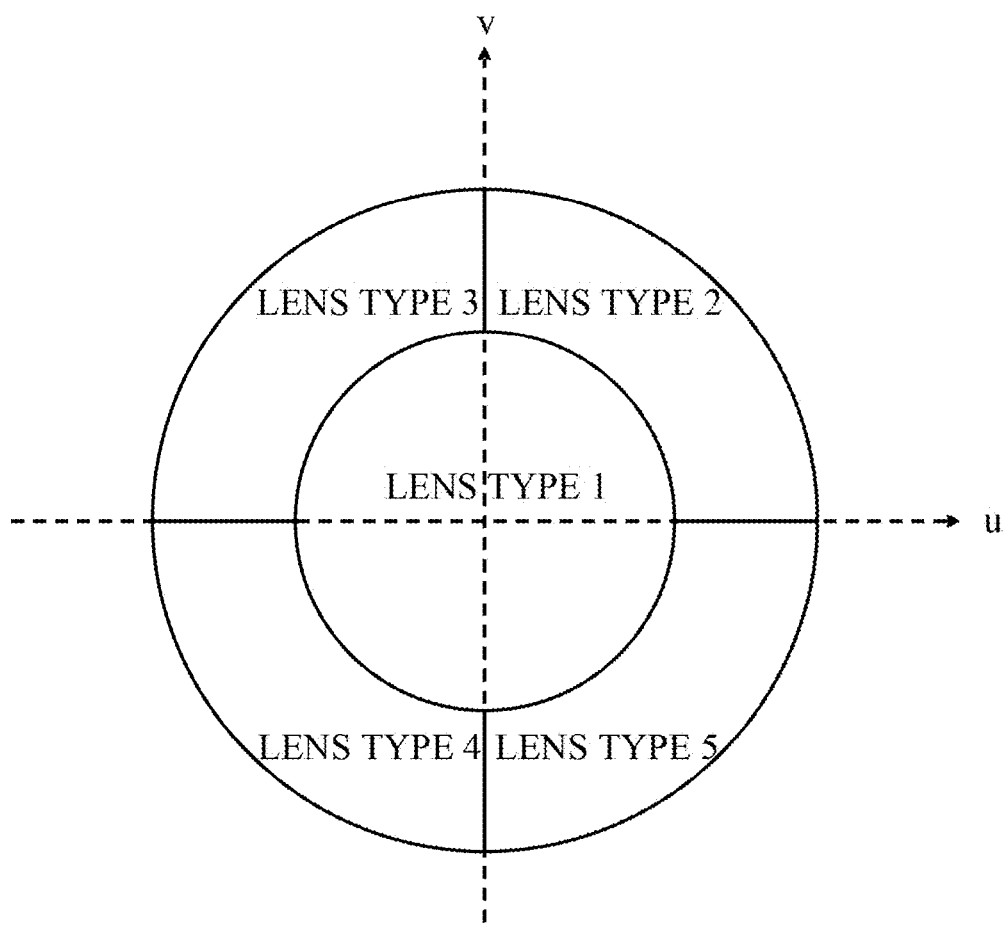
FIG. 17 is a diagram illustrating an example for a method of classifying the lens type depending on a color characteristic corresponding to a spectral transmittance of the lens according to the embodiment.

In this embodiment, a description has been given of the case in which there are two types of the lens type 1 and the lens type 2, but the same method can be applied to a case where there are lens types of three or more types. Since the methods explained in this embodiment is the method of changing the parameter depending on the lens type and the method of converting coefficients depending on the lens type, the increase in the subjected number of lens types can be easily dealt with by similarly storing the parameter or the conversion coefficients for each lens type. The lens types may be classified based on mount shapes of the lenses or the like, or may be classified based on the color characteristics corresponding to the spectral transmittances of the lenses. FIG. 17 is a diagram illustrating an example of a method for classifying the lens type depending on the color characteristics corresponding to the spectral transmittances of the lenses. As illustrated in FIG. 17, it is also possible to classify the lenses into groups of lens types 1 to 5 based on the color characteristics. This makes it possible to reduce the difference in hues of images caused by lenses having various color characteristics.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

As described above, via communication with an image pickup apparatus (camera main body 10), a communication task (lens microcomputer 211) of a lens apparatus (interchangeable lens 100) transmits setting information for setting a white detection area to a white detection area different from a white detection area that corresponds to a type of the lens apparatus and is stored in the image pickup apparatus. When an attached lens apparatus is a first lens apparatus of a first type, the setting information is a signal for changing the white detection area from a first white detection area corresponding to the first lens apparatus to a second white detection area corresponding to a second lens apparatus which is a lens apparatus whose type is a second type.

In this embodiment, when receiving the setting information for setting the white detection area to the white detection area different from the white detection area corresponding to the type of the lens apparatus, the image processing task (image processor 13) of the image pickup apparatus sets the white detection area based on the setting information and applies white balance adjustment. The image processing task may calculate a white balance coefficient for the white balance adjustment based on the white area detected in the image by using the white detection area based on the setting information.

In this embodiment, when receiving the setting information for setting the white detection area to the white detection area different from the white detection area corresponding to the type of the lens apparatus, if the image processing task cannot set the white detection area based on the setting information, the image processing task gives a warning.

According to each embodiment, it is possible to provide a lens apparatus, an image processing apparatus, an image pickup apparatus, a control method for a lens apparatus, an image processing method, and a memory medium each of which can reduce effects of lens apparatuses on hues of images even when the lens apparatuses attached to the image pickup apparatus are the same type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-189160, filed on Nov. 13, 2020 which is hereby incorporated by reference herein in its entirety.

What is claimed is:

1. A lens apparatus detachably attachable to an image pickup apparatus, the lens apparatus comprising:
   a notification unit configured to notify the image pickup apparatus of a type of the lens apparatus; and
   at least one processor or circuit configured to execute a plurality of tasks including a communication task configured to communicate with the image pickup apparatus,
   wherein, in a state where the lens apparatus is communicating with the image pickup apparatus, the communication task transmits setting information for setting a white detection area to a white detection area different from a white detection area that corresponds to the type of the lens apparatus and is stored in the image pickup apparatus, and
   wherein, in a state where the lens apparatus attached to the image pickup apparatus is a first lens apparatus of a first type, the setting information is a signal to change the white detection area from a first white detection area corresponding to the first lens apparatus to a second white detection area corresponding to a second lens apparatus of a second type.

2. The lens apparatus according to claim 1, wherein:
   the notification unit includes a resistor and a terminal for the image pickup apparatus to detect the type of the lens apparatus, and
   the terminal outputs voltage corresponding to the resistor to the image pickup apparatus.

3. The lens apparatus according to claim 1, wherein the type of the lens apparatus is classified based on a mount shape of the lens apparatus.

4. An image processing apparatus comprising:
   at least one processor or circuit configured to execute a plurality of tasks including:
      a determination task configured to determine a type of a lens apparatus used for capturing an image, among a plurality of types of lens apparatuses having respective color characteristics different from each other;
      an image processing task configured to apply white balance adjustment to the image; and
      a communication task configured to communicate with the lens apparatus,
   wherein, in a state where the image processing apparatus is communicating with the lens apparatus:
      the communication task receives setting information for setting a white detection area to a white detection area different from a white detection area that corresponds to the type of the lens apparatus; and
      the image processing task:
         sets the white detection area based on the setting information and applies the white balance adjustment; and
         issue a warning in a state where the image processing task is unable to set the white detection area based on the setting information.

5. The image processing apparatus according to claim 4, wherein the image processing task uses the white detection area based on the setting information to calculate a white balance coefficient used in the white balance adjustment based on a white area detected in the image.

6. An image pickup apparatus to which a lens apparatus is detachably attachable, the image pickup apparatus comprising:
   an image sensor; and
   at least one processor or circuit configured to execute a plurality of tasks including:
      a determination task configured to determine a type of a lens apparatus used for capturing an image, among a plurality of types of lens apparatuses having respective color characteristics different from each other;
      an image processing task configured to apply white balance adjustment to the image; and
      a communication task configured to communicate with the lens apparatus,
   wherein, in a state where the image pickup apparatus is communicating with the lens apparatus:

the communication task receives setting information for setting a white detection area to a white detection area different from a white detection area that corresponds to the type of the lens apparatus; and the image processing task sets the white detection area based on the setting information and applies the white balance adjustment, and wherein, in a state where the lens apparatus attached to the image pickup apparatus is a first lens apparatus of a first type, the setting information is a signal for changing the white detection area from a first white detection area corresponding to the first lens apparatus to a second white detection area corresponding to a second lens apparatus of a second type.

7. A control method for a lens apparatus detachably attachable to an image pickup apparatus comprising:

notifying the image pickup apparatus of a type of the lens apparatus; and communicating with the image pickup apparatus to transmit setting information for setting a white detection area to a white detection area different from a white detection area that corresponds to the type of the lens apparatus and store the setting information in the image pickup apparatus, and wherein, in a state where the lens apparatus attached to the image pickup apparatus is a first lens apparatus of a first type, the setting information is a signal to change the white detection area from a first white detection area corresponding to the first lens apparatus to a second white detection area corresponding to a second lens apparatus of a second type.

8. An image processing method comprising:

determining a type of a lens apparatus used for capturing an image, among a plurality of types of lens apparatuses having respective color characteristics different from each other;

applying white balance adjustment to the image; and communicating with the lens apparatus to:

receive setting information for setting a white detection area to a white detection area different from a white detection area that corresponds to the type of the lens apparatus; and in the applying:

set the white detection area is sot based on the received setting information and apply white balance adjustment; and issue a warning in a state where the white detection area is not settable based on the setting information.

9. A non-transitory computer-readable storage medium storing a computer program executable by a computer to execute the control method for the lens apparatus according to claim 7.

10. A non-transitory computer-readable storage medium storing a computer program executable by a computer to execute the image processing method according to claim 8.

* * * * *